United States Patent
Tauzia et al.

(10) Patent No.: US 9,393,503 B2
(45) Date of Patent: Jul. 19, 2016

(54) METHOD FOR EXTRACTING SOLID SOLUBLE CHARGES CONTAINED IN A PASTE

(71) Applicant: HERAKLES, Le Haillan (FR)

(72) Inventors: Jean-Michel Tauzia, Blanquefort (FR); Eric Giraud, Bordeaux (FR); Marie Gaudre, Le Haillan (FR)

(73) Assignee: HERAKLES, Le Haillan (FR)

( * ) Notice: Subject to any disclaimer, the term of this patent is extended or adjusted under 35 U.S.C. 154(b) by 24 days.

(21) Appl. No.: 14/347,168

(22) PCT Filed: Sep. 25, 2012

(86) PCT No.: PCT/FR2012/052133
§ 371 (c)(1),
(2) Date: Mar. 25, 2014

(87) PCT Pub. No.: WO2013/045804
PCT Pub. Date: Apr. 4, 2013

(65) Prior Publication Data
US 2014/0235788 A1     Aug. 21, 2014

(30) Foreign Application Priority Data
Sep. 26, 2011 (FR) ..................................... 11 58531

(51) Int. Cl.
*C06B 21/00* (2006.01)
*B01D 11/02* (2006.01)
*B01F 5/06* (2006.01)
*B01F 3/10* (2006.01)

(52) U.S. Cl.
CPC ............ *B01D 11/02* (2013.01); *B01D 11/0223* (2013.01); *B01F 5/061* (2013.01); *C06B 21/0091* (2013.01); *B01F 2003/105* (2013.01)

(58) Field of Classification Search
CPC ........................... B01D 11/02; C06B 21/0091
USPC .................... 210/767, 773; 523/336; 524/796
See application file for complete search history.

(56) References Cited

U.S. PATENT DOCUMENTS

| | | | |
|---|---|---|---|
| 4,909,868 | A | 3/1990 | Melvin |
| 6,824,626 | B2 | 11/2004 | Charrette et al. |
| 7,887,651 | B1 | 2/2011 | Mahe |
| 2005/0183804 | A1 | 8/2005 | Gaudre et al. |
| 2011/0112329 | A1 | 5/2011 | Waibel et al. |

FOREIGN PATENT DOCUMENTS

| | | |
|---|---|---|
| EP | 1216977 | 6/2002 |
| EP | 1333016 | 8/2003 |
| EP | 1741690 | 1/2007 |
| EP | 1790626 | 5/2007 |

*Primary Examiner* — Edward Cain
(74) *Attorney, Agent, or Firm* — Hamre, Schumann, Mueller & Larson, P.C.

(57) ABSTRACT

The main subject of the present invention is a process for processing a paste (5) containing a solid charge (C) with a view to extracting at least one part of said solid charge (C). Said process comprises continuously:
  mixing, in a mixer (8), said paste (5) with a liquid solvent (3), a solvent for said at least one part of said solid charge (C), with a view to dissolving, at least partially, said at least one part of said solid charge (C) in said solvent (3);
  recovering, after said mixing, a biphasic system (15) comprising, on the one hand, a solution (3') enclosing at least one fraction of said at least one part of said solid charge (C), dissolved in said solvent (3), and on the other hand, a solid residue (5') of said paste (5); and then,
  separating said solution (3') and said solid residue (5') of said paste (5).

28 Claims, 1 Drawing Sheet

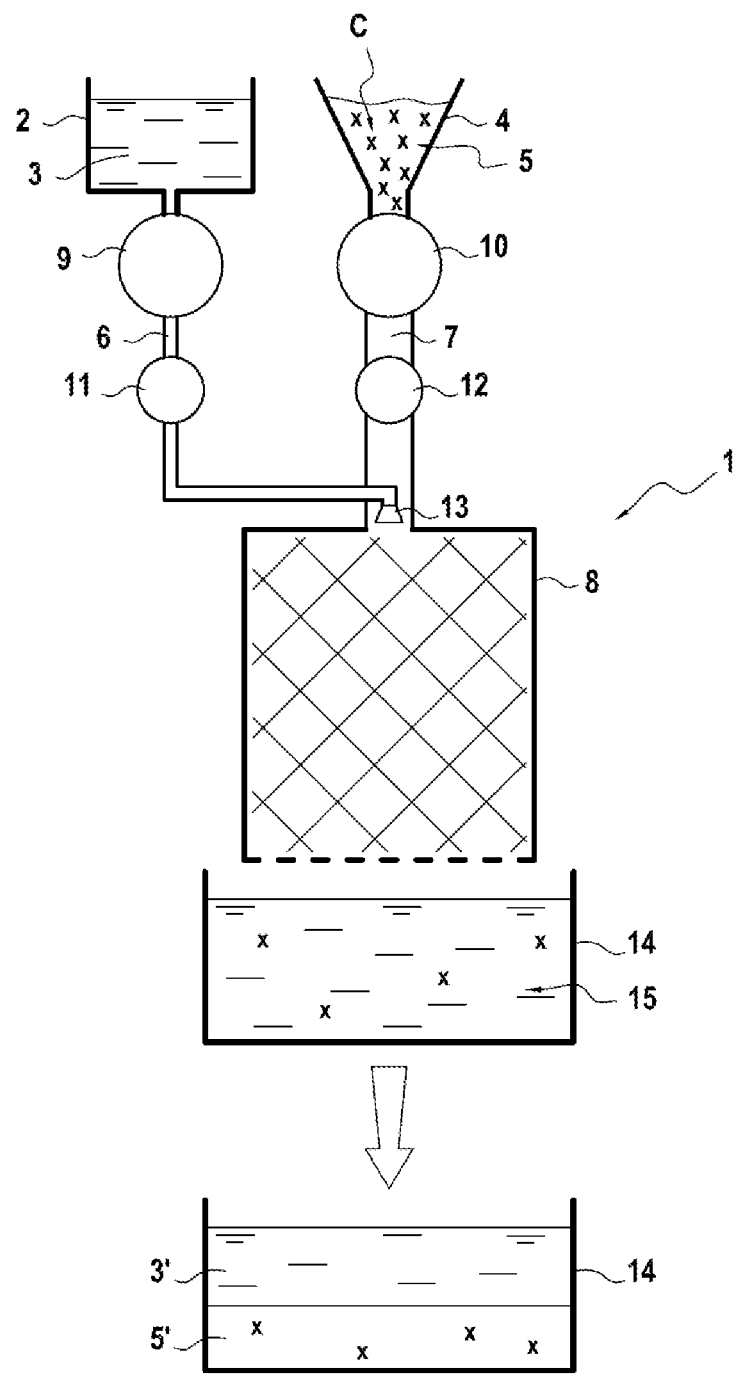

METHOD FOR EXTRACTING SOLID SOLUBLE CHARGES CONTAINED IN A PASTE

The subject of the present invention is a process for extracting solid charges contained in a paste. The present invention also relates to a process for producing a material containing charges (said material containing a solid charge), comprising the preparation of an intermediate paste and the conversion of said intermediate paste into said material. Said extraction process is opportunely carried out in the context of said production process for the processing of at least one part of the intermediate paste which has not been converted.

The process of the invention is particularly suitable for implementation on an industrial scale. It is suitable for the processing of pastes of energetic materials. It is more particularly described hereinafter with reference to the processing of such pastes, but those skilled in the art, upon reading what follows, will readily understand that its field of application is in no way limited to that of said pastes of energetic materials.

The energetic materials to which the invention relates are in particular those dedicated to spatial and military propellant applications, those present in gas generators for motor vehicle safety (airbag, etc.) and those present in explosive munitions and civil explosives.

One family of energetic materials concerned is that of propellants containing a binder and explosives containing a binder, said binder constituting a polymeric matrix which coats the charges.

The binder is prepared from an optionally energetic, liquid prepolymer which has reactive chemical end groups (hydroxyl groups, for example) called upon to react with at least one crosslinking agent, which is itself also liquid. The procedure as indicated hereinafter is generally carried out. The liquid prepolymer is mixed with the various ingredients (solid charges, additives) of the energetic material in a blender so as to obtain a paste. The crosslinking agent, depending on the embodiment of the process (batchwise, continuous or semi-continuous (see hereinafter)), is introduced either simultaneously with the other ingredients of the energetic material, or during or after kneading of the other ingredients of the energetic material. The paste, resulting from the kneading, is cast in a mold or extruded, according to the mode of process carried out. The paste containing the charges is then cured (crosslinked) by curing at a temperature compatible with the presence of the pyrotechnic materials. The crosslinked prepolymer thus coats all the ingredients, and in particular the charges, so as to form the energetic material in the desired form.

a) According to a first embodiment, the process is a "batchwise" process. A certain amount of paste is prepared and cast in molds in order to obtain a certain number of products (in a first step, the various ingredients are weighed and then introduced according to an appropriate order and kneaded to form the paste).

b) According to a second embodiment, the process, as described in patent applications EP 1 216 977 and EP 1 741 690, is a continuous process which essentially comprises (continuous) kneading, in a twin-screw mixer-extruder, the ingredients of the energetic material. The paste formed is, on leaving the mixer, either extruded in the form of rods (for the production of small objects), or cast in structures.

c) According to a third embodiment, the process, as described in patent application EP 1 333 016, is a semi-continuous "two-component" process. A mixture of two groups of components is cast: the first group of components, in the form of a paste, represents approximately 80% to approximately 99% by weight of the final product and essentially comprises the prepolymer, all of the solid charges and a part of the additives; the second group of components, in the form of a liquid, represents approximately 20% to approximately 1% by weight of the final product and comprises all of the crosslinking agent and the other part of the additives. The two groups of components are mixed in a static mixer and then cast, on leaving said mixer, in the form of a paste in one (or more) mold(s). According to one advantageous variant, as described in application EP 1 790 626, a small amount of the liquid crosslinking agent is included in the first group of components.

Whatever the embodiment of the process for producing energetic materials of this type, the ingredients are always in the intermediate state (before crosslinking of the liquid prepolymer, precursor of the binder) in the form of a paste.

Another family of energetic materials to which the present invention relates is that of pasty civil explosives which are in the form of a slurry or a gel. They are typically compositions (pastes) based on ammonium nitrate, aluminum and explosive such as tolite or pentrite, in the presence of a gelling agent or of a gum.

During the production of an energetic material, in particular of either of the two families above, a part of the paste formed (intermediate paste (intended to be converted into the desired final material) or paste corresponding to the desired final material) is inexorably unused and recovered as waste, in particular:

during the emptying and cleaning of the blenders, and
during the transient phases of starting or stopping the continuous or semi-continuous processes.

It may also be the case that the paste produced does not comply and is discarded and is therefore also recovered as waste.

Thus, for example, the amounts of propellant pastes not used (not converted) in the rest of the process may be significant in an industrial propellant production context. Several hundred kilos of paste may be recovered as waste at each industrial production cycle.

The extraction of the (solid) charges contained in this type of paste recovered as waste is desired:

either because of the toxicity of said charges and with a view to the processing thereof;
or in order to render these charges pyrotechnically inert when they have an explosive nature.

The total or partial extraction of the (solid) charges also makes it possible to render the residual paste inert, when these charges are a component that is required, at a certain weight content, for the pyrotechnic nature of said paste.

The most common energetic materials contain, as oxidizing charge (solid charge), perchlorates, such as potassium perchlorates or ammonium perchlorates, and/or nitrates, such as sodium nitrates or potassium nitrates, and/or as explosive charges, nitramines, such as hexogen or octogen.

To date, to the Applicant's knowledge, no process for extracting the solid charges contained in such pastes has been developed on an industrial scale. Admittedly, there are solvent extraction processes carried out in Soxhlet extractors, which have been improved to a greater or lesser extent, but said processes are capable of processing only small amounts of paste and they involve heating the solvent, or even boiling thereof, which is, a priori, difficult to make compatible with the processing of energetic materials containing sensitive charges. Furthermore, these processes do not allow continuous processing of the paste.

The processing of pyrotechnic waste of solid propellants, comprising crosslinked plastic binder, containing solid oxidizing charges of the type specified above, has already been widely described and carried out.

Said processing comprises:
reduction of the solid propellant to pieces of the size of one cm³, by means of a milling operation,
extraction of the solid charges (ammonium perchlorate and/or nitrates), by means of an operation of maceration under water, and, finally,
after separation of the solid and liquid phases, biological processing of the perchlorated and/or nitrated liquors.

Of course, to extract solid charges contained in a paste, it would be possible, when said paste contains a crosslinkable binder, to crosslink said paste beforehand in order to obtain a solid product, and then to subject said solid product obtained to the above processing. This obviously appears to be barely economically effective, in particular with reference to the intermediate storage infrastructures.

Quite obviously, the Applicant has also thought to apply the above processing directly to pastes, in particular to crosslinkable pastes which are not crosslinked. Nevertheless, it is not possible to envision the maceration step carried out with said pastes, since the paste/water mixing cannot be carried out by simple soaking and maceration, as is the case with the pieces of solid propellant.

The Applicant has therefore designed a process for processing pastes of energetic materials containing solid charges which is effective, which can be carried out rapidly and relatively inexpensively, and which makes it possible to extract said (soluble) solid charges from said pastes (with a solvent for said solid charges). This process can obviously be generalized to any type of paste comprising a type of charge to be extracted.

The present invention therefore relates to a process for extracting solid charges contained in a paste, and more particularly in a paste of energetic material. The process of the invention can in particular be used for the pastes of energetic materials containing, as (solid) charges, perchlorates and/or nitrates and/or explosive charges.

The present invention relates more specifically to a process for processing a paste containing a solid charge with a view to extracting at least one part of said solid charge. The charge in question can be of a single type or can consist of a mixture of solid charges of various types. The processing of the invention can, in the context of the presence of several types of solid charge, be carried out for an extraction of all the solid charges present (together), for a selective extraction (of at least one type of solid charge) or for successively several selective extractions. Whatever the type(s) of solid charge to be extracted, it is imagined, moreover, that, depending on the context, total extraction is not necessarily targeted or, on the contrary, that the implementation of several extractions of the same type, in series, is necessary in order to complete the extraction in question. The objective is, however, generally to extract a maximum of the solid charge by carrying out a single extraction step.

The processing process of the invention, a process for processing a paste containing a solid charge with a view to extracting at least one part of said solid charge, comprises, continuously:
mixing said paste with a liquid solvent, which is a solvent for said at least one part of said solid charge, with a view to dissolving, at least partially, said at least one part of said solid charge in said solvent;
recovering, after said mixing, a two-phase system comprising, on the one hand, a solution containing at least one fraction of said at least one part of said solid charge, dissolved in said solvent, and, on the other hand, a solid residue of said paste; and
separating said solution from said residue of said paste.

The processing process of the invention—which is continuous (this continuous nature of said process of the invention making the implementation thereof on an industrial scale particularly advantageous)—therefore comprises a solvent extraction process which uses a liquid solvent. Said liquid solvent is suitable for dissolving (the) solid charges contained in the paste. Said solvent (solvent for the charges to be extracted) is a single solvent or a mixture (of solvents, of a solvent and of at least one other compound, etc.). It is quite obviously selected in the light of the nature of the solid charges to be extracted (to be dissolved in it).

With reference to the solid charge to be extracted/liquid solvent pairing, those skilled in the art understand that there are numerous possibilities.

If the paste to be processed contains a single type of charge (ammonium perchlorate, for example), a solvent for this single type of charge (water, for example) is used and, during the mixing, it at least partially dissolves the charges of this single type. In order to complete (if necessary) the extraction of this single type of charge, the processing can be repeated (at least once) on at least one part of the solid residue obtained. The solid residue obtained can thus, according to a first variant, be subjected (at least partially) to the same processing (with mixing in a second mixer fed with said residue and with said solvent, mounted in series with the first mixer fed with said paste and said solvent) and generate another solid residue that it is also possible to process according to the invention: n successive extractions of the invention can thus be carried out. According to another variant, at least one part of the solid residue can be recycled (to the mixer fed with paste and solvent).

If the paste to be processed contains several types of charge, if a solvent exists that is common to these several types of charge and if the extraction desired is the extraction of all these types of charge (together), said solvent can be used and, during the mixing, it at least partially dissolves the charges present (of several types). In this situation also (several types of charge and a solvent common to all these types of charge), for optimization of the extraction, it may be desired to carry out several successive extractions (the first generating a (solid) residue on which a further extraction is carried out, etc.). Likewise, according to another variant, at least one part of the solid residue obtained can be recycled (to the mixer fed with paste and solvent).

If the paste to be processed contains several types of charge, if a selective extraction is desired and a solvent exists for carrying out such a selective extraction, such a selective solvent is used and, during the mixing, it at least partially dissolves just one part of the charge. It can be imagined that it is thus possible to successively carry out (in mixers mounted in series) selective extractions (each of said selective extractions possibly, if necessary, comprising several steps (see above)), with selective solvents, for successively dissolving various types of charge. Thus, the process of the invention can be carried out with a first solvent for obtaining a first solid residue and a solution containing at least one fraction of a part of said charge and can also comprise the same processing of said first solid residue obtained, with a second solvent for the extraction of at least one fraction of another part of said charge.

The paste processed according to the process of the invention (=the (solid) residue obtained) can therefore be processed again, as indicated above. Generally, at least one part of the paste residue recovered, separated from the liquid phase, if it still contains at least one substantial fraction of at least one part of the solid charge of the starting paste, can again undergo processing by means of the process of the invention, independently of the first processing or in the context thereof.

Thus, the process of the invention can comprise a first processing as specified above and, in addition, a second same processing of at least one part of the residue obtained at the end of said first processing, said second processing being carried out independently of said first processing or after recycling of at least one part of said residue, i.e. at the same time as said first processing. Thus, it is therefore possible to carry out (at least) two successive processings of the invention, with a view to completing the extraction of a single type of charge or the common extraction of several types of charge: the first on the starting paste and the second, independently, on the residue, or the first on the starting paste and the second on a mixture of starting paste (unprocessed) and of recycled residue.

Likewise, it is possible to carry out at least two successive extractions with different solvents for selective extractions of various types of charge.

Whatever the exact variant of implementation of the first step of the process of the invention (key step which is revisited later in the present text), at the end of said first step, on the one hand a solution containing at least one fraction of the at least one part of the solid charge, dissolved in the solvent, and on the other hand a (solid) residue of the paste, are recovered; the whole constituting a two-phase (liquid/solid) system. The constituent elements of this two-phase system are then separated, generally by (simple) settling out or by centrifugation, advantageously by (simple) settling out.

The solution obtained (separated from the solid phase, for example via an overflow) can then be processed by means of any process capable of purifying it or of exploiting it.

The (solid) residue of paste processed according to the invention (with optionally repeating of the processing) can also be recovered and then processed via the most suitable route. If the residual paste is inert, i.e. if it no longer has a pyrotechnic nature, after total or partial extraction of the charge of the starting paste, it can subsequently be handled and processed without any particular precaution, by conventional processes.

During the first step of the process of the invention, characteristically, paste/solvent mixing is therefore carried out for dissolution, at least partial (those skilled in the art know the limits of any dissolution), of the solid charge of said paste in said solvent. The more optimized the nature of the solvent and the quality of the mixture, the better the dissolution of said charge.

The nature of the solvent is obviously adjusted to, generally optimized according to, the nature of the (part of the) solid charge to be extracted. The solvent can in particular consist (essentially) of water (in the context of the extraction of perchlorates and/or nitrates) or of an organic solvent, such as ethyl acetate or acetone (in the context of the extraction of nitramines). Charge/solvent pairings are specified hereinafter with absolutely no implied limitation.

The quality of the mixture depends essentially on the viscosity of the paste processed and on the type of mixing carried out.

Those skilled in the art have understood that the pastes in question, in particular the propellants containing a high content of charges, can have a relatively high viscosity. However, they can easily imagine that the viscosity thereof can be reduced by heating. The pastes can in fact be heated upstream of and/or during the mixing thereof with the solvent. The solvent can also be used hot. However, it is emphasized here that such optional heating is in no way comparable to that required according to the prior art techniques for the vaporization of the solvent. In the context of the implementation of the first step of the process of the invention, the solvent is liquid. The pastes containing the charges, processed according to the process of the invention (i.e. under the conditions (most particularly temperature conditions) for carrying out the mixing), generally have a (Brookfield) viscosity of between 50 and 2000 Pa·s.

The mixing of the paste containing charges and of the solvent is advantageously carried out in a static mixer. In order to carry out the mixing in such a mixer, the paste containing charges and the solvent are generally introduced into said mixer under pressure (the pressure for the two introductions being the same); this being the case more particularly when said paste has a high viscosity. Thus, the mixing of the paste and of the solvent is very advantageously carried out in a static mixer fed with said paste and said solvent under (the same) pressure. Such an introduction of the "reagents" under pressure makes it possible to feed said mixer continuously and completely evenly. Given the viscosity of the paste (which can pose problems for the pumping thereof) and in order to avoid mechanical stresses on said paste that are too great, most particularly when it is a pyrotechnic paste, the pressures at which the solvent and said pyrotechnic paste are introduced into the static mixer generally remain less than or equal to $15 \times 10^5$ Pa (15 bar).

The paste and the solvent can be introduced separately or together, after premixing, into the mixer, advantageously the static mixer.

Thus, according to one variant, said paste and said solvent are introduced separately into the mixer. Said solvent and said paste are, according to this variant, advantageously introduced at various radial points of the inlet vent of the mixer, in order to obtain a homogeneous injection distribution at the inlet of the mixer.

According to another variant, said paste and said solvent are premixed, generally summarily, for example by circulation in a pipe which opens out into the mixer. The premixture of said paste and of said solvent is then introduced into the mixer.

The processing process of the invention can be carried out at ambient temperature (20-25° C.) or, advantageously, at least partially, at a temperature above ambient temperature (20-25° C.) (i.e. with heating) in order to facilitate the circulation of the paste (see above) or (and) the mixing (see above) of said paste with the solvent, or even the premixing and the mixing of said paste with said solvent, by reducing the viscosity of said paste. The solvent or (and) the paste can thus be heated upstream of the mixing thereof or (and) during said mixing.

At the end of the process, the solution and the paste residue are separated. They are advantageously separated by settling out. The settling tank can be heated or cooled according to the temperature parameters favorable to said settling out. After settling out, said solution floats above said paste residue and can be recovered, for example via an overflow.

The process of the invention is entirely suitable for the processing of pastes of energetic materials containing soluble solid charges such as ammonium perchlorate and/or perchlorates and nitrates of alkali or alkaline-earth metals, such as potassium perchlorate and sodium nitrate. The energetic materials containing soluble solid charges of this type are typically propellants for spatial or military applications (of the type: plastic binder/ammonium perchlorate/Al) or for use in a gas generator for an airbag. For soluble solid charges of this type, the solvent most suitable for the implementation of the process of the invention is water, since said soluble solid charges are highly soluble therein. The brines (solutions) resulting from the processing according to the invention of this type of paste can be biologically purified by nitrification/denitrification and reduction of the perchlorate ions according to the technologies described in patent applications FR 2 788 055 and EP 2 285 745.

Pastes of energetic materials containing explosive soluble solid charges such as, for example, CL20, octogen or hexogen can also be processed by means of the process of the invention. The most effective solvent is advantageously chosen, i.e. advantageously a solvent in which the charge is highly soluble. For the charges identified above, ethyl acetate or acetone is advantageously used.

It is recalled, generally, that the process of the invention is particularly suitable for the processing of energetic pastes, but that its field of application is not limited to the processing of this type of paste.

Said process of the invention is most particularly suitable for the processing of energetic pastes containing solid charges such as:
- charges of ammonium perchlorate, alkali or alkaline-earth metal perchlorate or nitrate, and mixtures thereof; and/or
- explosive charges, such as CL20, octogen, hexogen, tolite, pentrite and mixtures thereof.

Said process of the invention is generally but not exclusively carried out with, as solvent, water or an organic solvent. Said organic solvent advantageously consists of ethyl acetate or acetone.

Some information regarding devices suitable for implementing the process of the invention, as described above, are intended to be given hereinafter.

According to one preferred variant, such a device comprises (at least) a static mixer. According to a first embodiment, two pipes open out into the inlet vent of said static mixer, the first providing the introduction of the paste containing charges and the second providing the introduction of the solvent, into said static mixer. Said paste and said solvent are stored, upstream, in separate containers. They are continuously injected into said pipes and then into the static blender using pumps or pistons. The end of the pipe conveying the solvent into the inlet vent of said mixer advantageously has a dispenser, for example in the form of a sprinkler rose or with star-shaped branches; the end of the pipe conveying the paste being arranged so as to introduce said paste, in the inlet vent of said static blender, around said dispenser. According to a second embodiment, the paste and the solvent, stored upstream in separate reservoirs, are injected, by means of pumps or a piston, respectively, into a first pipe and a second pipe, both flowing into a third pipe connected to the inlet vent of the static mixer. Said paste and said solvent are thus brought into contact in said third pipe. Advantageously, the end of the second pipe (for circulation of the solvent) has, at its connection with said third pipe, a distributor, for example in the form of a sprinkler rose or a star. The end of the first pipe is then arranged on one side of the third pipe, such that said paste is injected around said dispenser.

If necessary, in order to reduce the viscosity of the paste and to optimize the mixing in the mixer, the paste and/or the solvent are introduced while hot into said mixer. The containers and/or pumps and/or pipes then have appropriate heating means. For the same reasons, the static mixer can be equipped with heating means, such as a coil or a jacket providing circulation of a heat-transfer fluid.

A tank is placed at the outlet of the static mixer in order to collect the mixture leaving said mixer. This tank can be temperature-conditioned by a heating or cooling means according to the temperature parameters favorable to the settling out of the mixture.

The flow rates of the paste containing charges and of the solvent, at the inlet of the device which has a static mixer, ensuring non-stop feeding of said mixer, are controlled by manometers, optionally coupled with a means for servo-controlling the pumps or pistons providing said flow rates.

The invention also relates to a process for producing a material containing charges (containing a solid charge in a matrix), comprising the preparation of an intermediate paste containing a solid charge and the conversion of said intermediate paste into said material. According to said process, at least one part of said intermediate paste which has not been converted is processed in accordance with the process for processing a paste described above. Said unconverted intermediate paste comprises, or even generally consists of, the waste from said production process (see above: waste such as waste per se or discarded material).

According to one variant, said intermediate paste contains, in addition to said solid charge, a liquid prepolymer and at least one crosslinking agent, said conversion then comprising the crosslinking of said liquid prepolymer. The context in this case may be the production of propellants or explosives containing a binder. However, it is noted that this variant can be implemented in other contexts, in fact in any context in which a paste containing a binder is intended to be crosslinked.

The appended FIG. 1 illustrates a variant of embodiment of a device suitable for implementing the process of the invention.

With reference to this FIGURE, the device 1 comprises, on the one hand, a container 2 which receives a solvent 3 and a container 4 which receives a paste 5, said paste 5 containing a solid charge C. The elements of said solid charge C are symbolized by crosses. Pipes 6 and 7 connect, respectively, the containers 2 and 4 to the inlet of a static mixer 8. Pumps 9 and 10 provide, respectively, the injection under pressure, into the pipes 6 and 7, of the solvent 3 and of the paste 5. Manometers 11 and 12 make it possible to control the pressure of injection into the pipes 6 and 7, and optionally to adjust the flow rate of said pumps 9 and 10. The end of the pipe 6, at the inlet of the static mixer 8, has a dispenser 13. The end of the pipe 7, at the inlet of the static mixer 8, is arranged such that the paste 5 is distributed around said dispenser 13. A recovery tank 14 is placed at the outlet of the static mixer 8. Said tank recovers the two-phase system 15. After settling out, the two phases of this two-phase system are separated. The solid residue of paste 5 (which contains the undissolved fraction of the charge (C)) has been shown in 5' and the solvent containing the dissolved (extracted) fraction of the solid charge C has been shown in 3'.

The mechanical elements of the device 1, shown in FIG. 1, can be heated by means of heating coils or jackets in which a heat-transfer fluid circulates.

The implementation of the process of the invention in a device as shown in FIG. 1 (but not comprising a dispenser) was carried out under the following conditions:
- composition of the paste: 68% by weight of ammonium perchlorate, 14% by weight of a hydrocarbon-based polymer (PBHT: polybutadiene hydroxytelechelic) and additives, 18% aluminum;
- temperature of the static mixer: 50° C.; viscosity of the paste at this temperature: 1200 Pa·s;
- paste flow rate: 1 kg/h (of which 680 g/h of ammonium perchlorate);

water flow rate (water=solvent): 10 l/h;
pressure in the static mixer: $3\times10^5$ Pa (3 bar).

After settling out of the two-phase system, recovered at the end of the implementation of the first step of the process of the invention (mixing in the static mixer), a brine containing a concentration of greater than 60 g/l of dissolved ammonium perchlorate, and a paste residue containing less than 5% by weight of ammonium perchlorate, said content being sufficiently low for said paste residue to be considered nonpyrotechnic, are recovered.

The invention claimed is:

1. A process for processing a paste containing a solid charge with a view to extracting at least one part of said solid charge, which comprises, continuously:
    mixing, in a mixer, said paste with a liquid solvent, which is a solvent for said at least one part of said solid charge, with a view to dissolving, at least partially, said at least one part of said solid charge in said solvent;
    recovering, after said mixing, a two-phase system comprising, in a first phase, a solution containing at least one fraction of said at least one part of said solid charge, dissolved in said solvent, and, in a second phase, a solid residue of said paste; and then
    separating said solution from said solid residue of said paste; and
    wherein said paste is an energetic paste, comprising a solid charge that comprises first charges or second charges or a mixture thereof,
        wherein the first charges are selected from the group consisting of charges of ammonium perchlorate, charges of alkali or alkaline-earth metal perchlorate, charges of alkali or alkaline-earth metal nitrate, and mixtures thereof, and
        the second charges are explosive charges, selected from the group consisting of CL20 charges, octogen charges, hexogen charges, tolite charges, pentrite charges, and mixtures thereof.

2. The process as claimed in claim 1, wherein said paste containing a solid charge has, under the conditions for carrying out the mixing, a viscosity of between 50 and 2000 Pa·s.

3. The process as claimed in claim 1, wherein said mixing is carried out in a static mixer.

4. The process as claimed in claim 3, wherein said paste and said solvent are introduced into said static mixer under pressure.

5. The process as claimed in claim 1, wherein said paste and said solvent are introduced separately or together, after being brought into contact, into said mixer.

6. The process as claimed in claim 1, which is carried out at ambient temperature or, at least partially, at a temperature above ambient temperature.

7. The process as claimed in claim 1, wherein the separation of said solution and of said solid residue is carried out by settling out.

8. The process as claimed in claim 1, which further comprises recovering said solution separated from said solid residue via an overflow.

9. The process as claimed in claim 1, which further comprises the same processing of at least one part of said solid residue, carried out independently of the processing of said paste or, after recycling at least one part of said solid residue, at the same time as the processing of said paste.

10. The process as claimed in claim 1, which is carried out with a first solvent so as to obtain said solid residue and a solution containing at least one fraction of a first part of said solid charge,
    wherein the process also comprises the same processing of said solid residue obtained, with a second solvent so as to extract at least one fraction of a second part of said solid charge.

11. The process as claimed in claim 1, wherein the solvent is water or an organic solvent.

12. A process for producing a material containing charges, comprising:
    preparing an intermediate paste comprising a solid charge; and
    converting said intermediate paste into said material,
    wherein at least one part of said intermediate paste, which has not been converted, is processed in accordance with a process comprising, continuously:
        mixing, in a mixer, said paste with a liquid solvent, which is a solvent for said at least one part of said solid charge, with a view to dissolving, at least partially, said at least one part of said solid charge in said solvent;
        recovering, after said mixing, a two-phase system comprising, in a first phase, a solution containing at least one fraction of said at least one part of said solid charge, dissolved in said solvent, and, in a second phase, a solid residue of said paste; and then
        separating said solution from said solid residue of said paste, and
    wherein said paste is an energetic paste comprising a solid charge that comprises first charges or second charges or a mixture thereof,
        wherein the first charges are selected from the group consisting of charges of ammonium perchlorate, charges of alkali or alkaline-earth metal perchlorate, charges of alkali or alkaline-earth metal nitrate, and mixtures thereof, and
        the second charges are explosive charges.

13. The process as claimed in claim 12,
    wherein said intermediate paste comprises: in addition to said solid charge,
    a liquid prepolymer; and
    at least one crosslinking agent, and
    in the process, said converting step comprises crosslinking of said liquid prepolymer.

14. The process as claimed in claim 1, wherein said solvent is selected from the group consisting of ethyl acetate and acetone.

15. The process as claimed in claim 1,
    wherein said solid charge comprises the first charges selected from the group consisting of the charges of the ammonium perchlorate, the charges of alkali or alkaline-earth metal perchlorate, the charges of alkali or alkaline-earth metal nitrate, and the mixtures thereof, and
    said solvent is water.

16. The process as claimed in claim 15,
    wherein said solid charge comprises the charges of ammonium perchlorate, and
    said solvent is water.

17. The process as claimed in claim 12,
    wherein said paste comprising the solid charge has, under conditions for carrying out the mixing, a viscosity of between 50 and 2000 Pa·s.

18. The process as claimed in claim 12, wherein said mixing is carried out in a static mixer.

19. The process as claimed in claim 18, wherein said paste and said solvent are introduced into said static mixer under pressure.

20. The process as claimed in claim 12, wherein said paste and said solvent are introduced separately or together, after being brought into contact, into said mixer.

21. The process as claimed in claim 12, which further comprises the same processing of at least one part of said solid residue, carried out independently of the processing of said paste or, after recycling at least one part of said solid residue, at the same time as the processing of said paste.

22. The process as claimed in claim 12, which is carried out with a first solvent so as to obtain said solid residue and the solution containing the at least one fraction of a first part of said charge, and further comprises carrying out the processing of claim 13 for said solid residue obtained, with a second solvent, with which at least one fraction of second part of said charge is extracted.

23. The process as claimed in claim 12, wherein said explosive charges are selected from the group consisting of CL20 charges, octogen charges, hexogen charges, tolite charges, pentrite charges, and mixtures thereof.

24. The process as claimed in claim 12, wherein said solvent is water or an organic solvent.

25. The process as claimed in claim 12, wherein said solvent is selected from the group consisting of ethyl acetate and acetone.

26. The process as claimed in claim 12,
wherein said solid charge comprises the first charges selected from the group consisting of the charges of ammonium perchlorate, the charges of alkali or alkaline-earth metal perchlorate, the charges of alkali or alkaline-earth metal nitrate, and mixtures thereof, and said solvent is water.

27. The process as claimed in claim 26, wherein said solid charge comprises the charges of ammonium perchlorate and said solvent is water.

28. A process for producing a material containing charges, comprising:
preparing an intermediate paste comprising a solid charge; and
converting said intermediate paste into said material,
wherein at least one part of said intermediate paste, which has not been converted, is processed in accordance with a process comprising, continuously:
mixing, in a mixer, said paste with a liquid solvent, which is a solvent for said at least one part of said solid charge, with a view to dissolving, at least partially, said at least one part of said solid charge in said solvent;
recovering, after said mixing, a two-phase system comprising, in a first phase, a solution containing at least one fraction of said at least one part of said solid charge, dissolved in said solvent, and, in a second phase, a solid residue of said paste; and then
separating said solution from said solid residue of said paste, and
wherein said intermediate paste comprises: in addition to said solid charge,
a liquid prepolymer; and
at least one crosslinking agent, and
wherein in the process, said converting step comprises crosslinking of said liquid prepolymer.

* * * * *